Oct. 6, 1925.
J. H. PACE
1,556,302
CONTROLLING DEVICE FOR MOTOR VEHICLES
Original Filed July 24, 1924
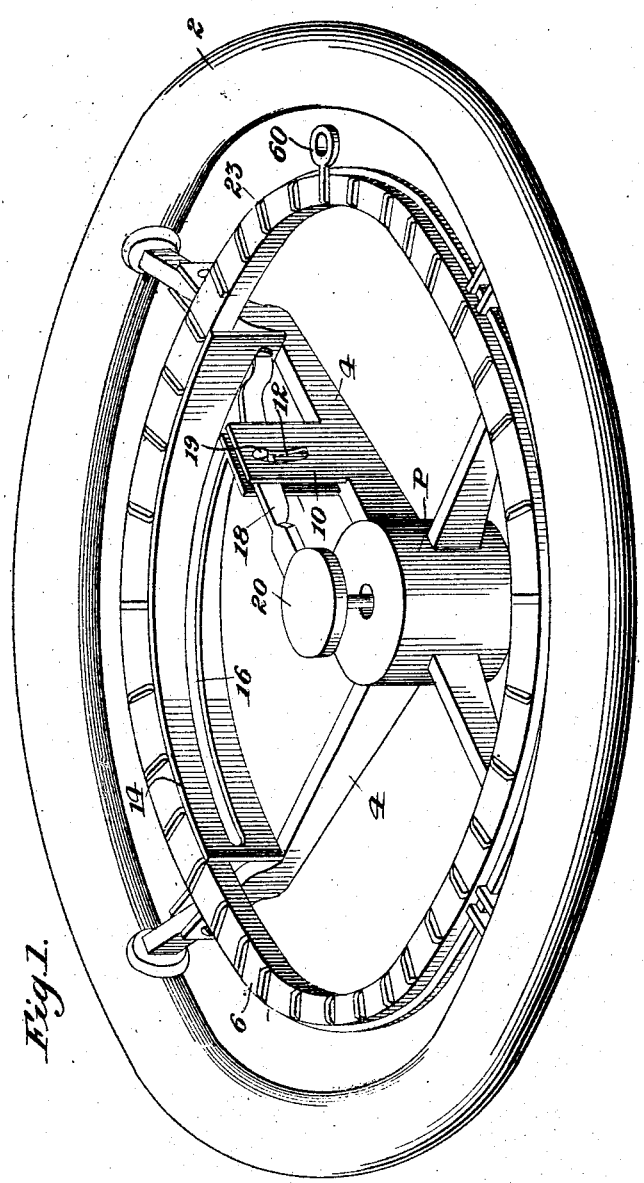
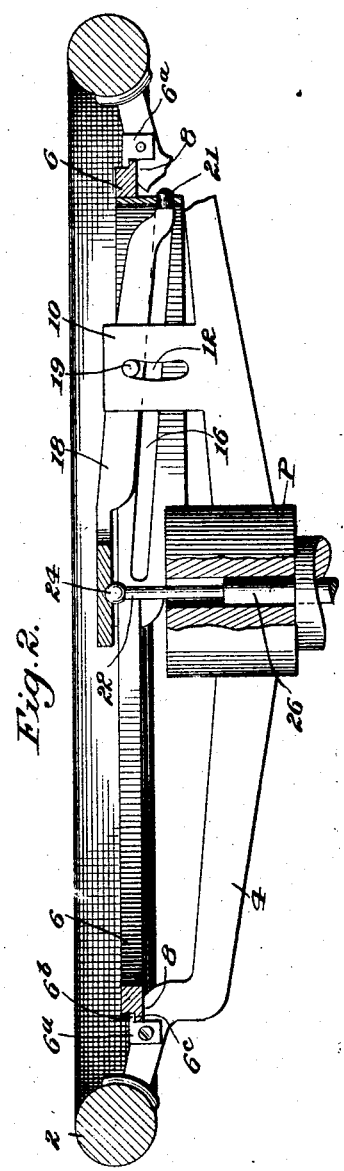
Inventor:
J. H. Pace,
by C. A. Mason Att'y.

Patented Oct. 6, 1925.

1,556,302

UNITED STATES PATENT OFFICE.

JAMES HARALSON PACE, OF SCOTTDALE, GEORGIA.

CONTROLLING DEVICE FOR MOTOR VEHICLES.

Application filed July 24, 1924, Serial No. 727,920. Renewed July 31, 1925.

*To all whom it may concern:*

Be it known that I, JAMES HARALSON PACE, a citizen of the United States of America, residing at Scottdale, in the county of De Kalb and State of Georgia, have invented certain new and useful Controlling Devices for Motor Vehicles, of which the following is a full, clear, and exact description.

This invention relates to controlling devices for motor vehicles, and more particularly to such devices which are located on the steering wheel of the vehicle.

An object of the invention is to provide a device of the character referred to which will permit of the control of gas from the carburetor to the engine by movements of the thumb of the operator's hand while the same is grasping the steering wheel. This has the advantage of rendering it unnecessary to keep the foot on the foot-control pedal, thereby avoiding the tiresome strain which follows from the continuous use of the pedal, especially on long drives. A further advantage of the invention is that the hand is better adapted for manipulating parts which require precise movements and it is accordingly safer to operate the throttle through mechanism whose movements are initiated by a part of the operator's hand than where the foot is employed for such purpose. While the device which controls the throttle is operated by the thumb it may be used in conjunction with the foot-control pedal if desired, that is, by depressing the pedal to the point desired, the thumb-control lever may be moved until the slack in the spring of the carburetor lever is taken up, at which point the foot may be moved from the pedal and the adjustment of the throttle will remain in the position at which it was set by the thumb lever until the latter is intentionally moved upward to a new position.

The foregoing, and other important functions and advantages of the invention will be more clearly understood from the following description, when considered in connection with the accompanying drawings illustrating a preferred embodiment of the invention, and in which:

Fig. 1 is a perspective view of a steering wheel, showing one form of the controlling device, and Fig. 2 is a transverse section thereof.

Referring to Figs. 1 and 2, a steering wheel 2 having the usual spokes 4 is equipped with a controlling ring 6, which rests upon guiding surfaces 8 of the spokes, the ring 6 being concentrically arranged within the rim of the wheel so as to leave a suitable space as, for example, about one and one-half inches between said ring and rim.

Secured within the ring 6 is a curved plate 14, provided with an inclined slot 16 which rises from a low point near one end of the plate to a higher point near the other end of the plate. The slot 16 operates as a cam surface, and receives the outer end of a lever 18, said end of the lever being provided preferably with an anti-friction roll 21 which is designed to run in the slot. One of the spokes 14 is provided with upwardly projecting spaced plates 10, which are provided with slots 12 to receive a fulcrum pin or pins 19 of the lever 18, and said lever terminates at its inner end in a flattened thumb piece 20. The construction being described is adapted for use with a steering post which is surmounted by the hub P having therein a rod 26 which is connected through suitable levers with the throttle. A short rod 22, provided at its upper end with a ball 24 which seats in a spherical depression or socket in the under side of the disk 20, rests at its lower end upon the upper terminal of the rod 26. When the lever 18 is depressed at its inner end the rods 22 and 26 are likewise depressed and motion is transmitted to the throttle for opening the latter more or less in accordance with the amount of downward movement imparted to the inner end of the lever. The ring 6 is, in the construction being described, recessed annularly on its outer edge portion to form a shoulder 6ᶜ, and brackets 6ᵃ may be fastened to opposite sides of each spoke, said brackets being provided with over-hanging lugs 6ᵇ which engage the shoulders 6ᶜ. By this means the controlling ring is held upon the spokes of the steering wheel and said controlling ring is so mounted as to be rotatable freely between the guiding surface 8 on the spokes and the brackets 6ᵃ.

The upper portion of the controlling ring is roughened or provided with suitable projections 23 so that the thumb of the operator may readily engage therewith without slipping. Said ring is preferably furthermore provided with a projecting thumb piece 60, having a depression therein for ready engagement by the operator's thumb.

In the operation of the device just described, while the hand of the driver grasps the rim of the steering wheel 2, his thumb can easily reach over and engage the thumb piece 60 and turn the controlling ring in either direction to increase or diminish the supply of gas to the motor, it being noted that the movement of the control ring 6 will cause the operation of the lever 18 through the engagement of the inclined slot in the plate 14 with the roll 21 on the outer end of the lever, one direction of movement of the controlling ring serving to effect a depression of the inner end of the lever 18, while the opposite direction of movement of said wheel will permit the inner end of said lever to rise under the influence of the spring which acts upon the usual throttle-control lever for normally closing the throttle. By reason of the stress of such spring the lever 18 will be normally under pressure tending to force its outer end downwardly and create a sufficient amount of friction to hold the control ring 6 in the position to which it has been moved by the thumb piece. It is evident that the usual movements of the steering wheel in guiding the car do not affect the adjustments of the ring 6 and lever 18 as the thumb piece 20 will be permitted to revolve freely about the ball 24 as a center during these turning movements.

The inner end of the lever 18 may be depressed for opening the throttle without rotating the control ring 6 if desired by simply pressing upon the disk 20 whereupon the lever will fulcrum at its outer end the studs 19 moving down freely in the slots 12. The device when thus used as a hand accelerator does not displace the foot accelerator but can be used in addition thereto when so desired. The hand accelerator is especially useful for starting and stopping on steep grades, as by its use the right foot may be kept constantly on the brake pedal to control the car through that means.

The foot accelerator can be used in making a sharp turn in starting, when the operation of guiding the car is more vitally important than the control of the gas to the motor.

A very complete control of the car may be secured by the construction described after a little practice, and by the use of the control wheel alone without using the hand or foot accelerator. This is accomplished with the present invention by using the series of finger grips 23, which are located at convenient intervals on the control ring or wheel 6 and allow the operation of the control wheel by the driver while his hand occupies any one of a variety of positions during the steering of a car.

The right is reserved to make such changes in the form, construction of elements, or their arrangement as would be contemplated by the spirit of the invention, and included within the terms of the following claims.

Having thus described my invention what I claim as new and desire to secure by United States Letters Patent is:

1. A controlling mechanism for motor vehicles comprising, in combination with the steering wheel of the vehicle, of a ring supported for turning movements within said wheel, and means operated by said ring to control the supply of fuel to the motor.

2. In a controlling device for motor vehicles, the combination with the steering wheel of the vehicle, of a ring supported for turning movements within said wheel, a lever and connections therefrom to the fuel regulating means, and means between said ring and lever to effect movements of the lever through operation of the ring.

3. In a controlling device for motor vehicles, the combination with a steering wheel, of a ring mounted within said wheel and supported rotatively upon the spokes thereof, an arcuate member provided with an inclined slot carried by said ring, and a lever having a portion engaging said slot and another portion connected with the fuel controlling devices of the motor, said ring being supported for rotation by the thumb or finger of the driver's hand while steering the vehicle.

4. A controlling device for motor vehicles, comprising a steering wheel, a ring supported concentrically within said wheel upon the spokes thereof and provided with thumb-engaging means, a plate carried by said ring and having an inclined portion, and a lever fulcrumed upon a spoke of said wheel and having one end engaging said inclined portion and its other end connected with the fuel supplying controlling device of the motor.

5. A controlling device for motor vehicles comprising, in combination, a steering wheel, a ring concentrically arranged within said wheel and supported rotatively relative to the spokes thereof, a plate having a cam slot carried by said ring, a projection from one of said spokes provided with a slot, a lever having a pin engaging said slot, one end of said lever having engagement with the slot in said plate and the opposite end of said lever provided with a thumb piece having a socket in its under surface, a pin received within a bore in the steering post of the vehicle and having a ball engaging said socket, and a rod within the steering post engaging said pin at its upper end and adapted for connection at its lower end with means for controlling the admission of fuel to the motor.

6. A controlling mechanism for motor vehicles, comprising in combination with the steering wheel of the vehicle, of a ring supported on the steering wheel for turning movements within it, said ring being furthermore capable of being turned simultaneously with and by the movement of the steering wheel in guiding the car, and also capable of being turned independently of said movement of the steering wheel.

7. A controlling mechanism for motor vehicles, comprising in combination with the steering wheel of the vehicle, of a ring supported on the steering wheel for turning movements within it, and means by which the ring turns with the movement of the steering wheel in the act of guiding the car without affecting the gas supply, and means by which said ring is capable of controlling the gas supply when turned independently of the movement of the steering wheel.

8. A controlling mechanism for motor vehicles, comprising in combination with the steering wheel of the vehicle, a ring mounted for turning movements thereon, said ring being of smaller diameter than and located within the steering wheel, connections from said ring for controlling the gas supply to the motor by turning movements of the ring, said ring being mounted for simultaneous turning movements with the steering wheel during the operation of the latter to steer the vehicle, but being capable of independent, fuel-controlling movements through pressure of the operator's thumb during the steering operation, or when the steering wheel is at rest.

In testimony whereof I have hereunto set my hand this 14th day of July, A. D. 1924.

JAMES HARALSON PACE.

Certificate of Correction.

It is hereby certified that in Letters Patent No. 1,556,302, granted October 6, 1925, upon the application of James Haralson Pace, of Scottdale, Georgia, for an improvement in "Controlling Devices for Motor Vehicles," errors appear in the printed specification requiring correction as follows: Page 2, strike out lines 72 to 77, comprising claim 1, and for claims numbered 2, 3, 4, 5, 6, 7, 8 read *1, 2, 3, 4, 5, 6, 7;* and that the said Letters Patent should be read with these corrections therein that the same may conform to the record of the case in the Patent Office.

Signed and sealed this 8th day of December, A. D. 1925.

[SEAL.]
WM. A. KINNAN,
*Acting Commissioner of Patents.*